Figure 1:
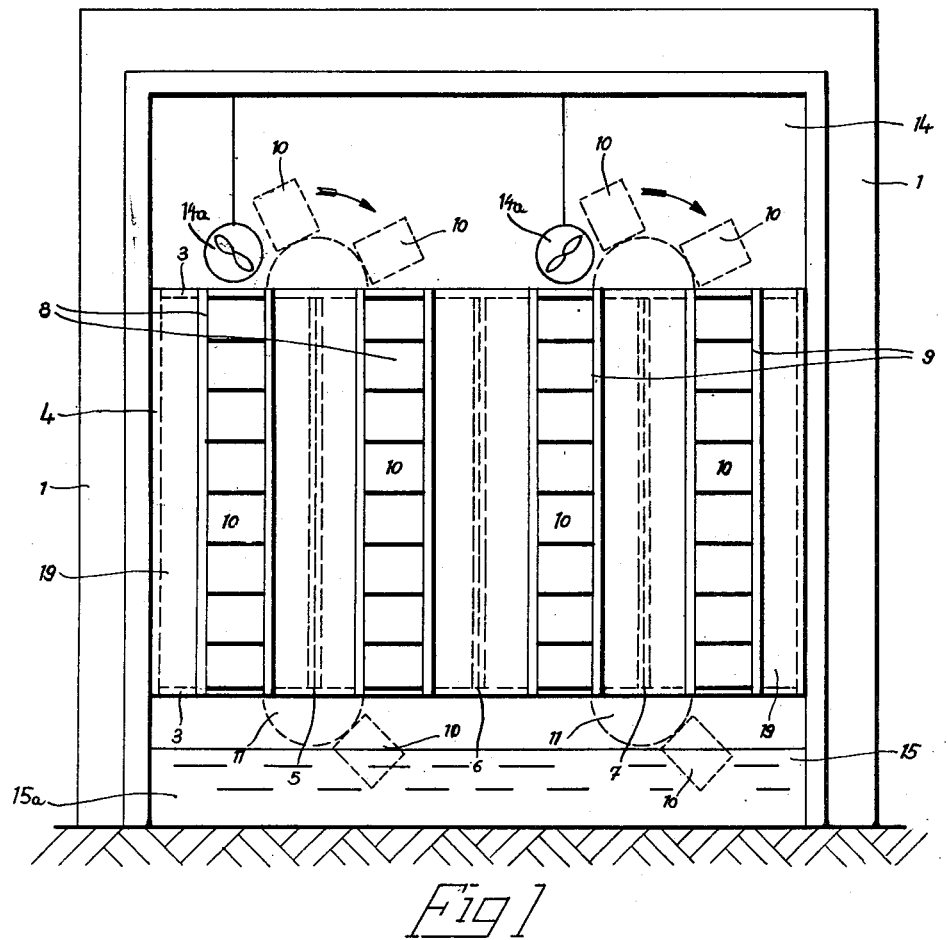

INVENTORS:
HEINRICH SPODIG AND
ALOYS SCHIRP

United States Patent Office 2,804,162
Patented Aug. 27, 1957

2,804,162
FILTER

Heinrich Spodig, Lunen, Westphalia, and Aloys Schirp, Dortmund, Germany

Application October 25, 1954, Serial No. 464,582
Claims priority, application Germany October 24, 1953
8 Claims. (Cl. 183—7)

This invention relates to filters.

More particularly, this invention relates to magnetic filters for filtering out magnetizable particles from a stream of gaseous medium, such as a stream of air.

There exist known filtering devices for filtering a stream of air used to cool electrical machinery, or for filtering air fed to the intake of compressors, blowers, and the like. Usually these filters consist of units through which the air to be filtered is passed. The units may consist of individual plate members which are spaced from each other and which are in the path of an air stream so that air will flow through the spaces between the plate members. The filter plates may be covered with a thin film of oil so that dust particles in the stream of air passing through the filtering units will adhere to the filter plates.

However, filtering devices using such units are capable of removing only very fine dust particles from a stream of air. The above described filtering units cannot remove heavier dust particles from a stream of air, or metallic or metallic oxide particles often found in the air in the vicinity of certain industrial processes, such as in steel mills, foundries, and the like. The oil film on the filter plates is not sufficiently strong to cause metallic or metallic oxide particles to adhere to the filter plates.

It is therefore one of the objects of this invention to provide a filter apparatus which is capable of filtering out magnetizable particles from a stream of gaseous medium, such as a stream of air.

It is another object of this invention to provide a magnetic filter apparatus in which a stream of gaseous medium is exposed to a magnetic field so that magnetizable particles in the stream of gaseous medium are urged toward a plate member so as to be separated from the stream of gaseous medium.

It is also an object of the present invention to provide a magnetic filter apparatus in which a magnetic field is generated entirely within a predetermined space so as to produce a closed or self-contained magnetic field, filtering units being arranged within this self-contained magnetic field and adapted to be exposed to a stream of gaseous medium to be filtered.

The objects of this invention also include the provision of a filter apparatus which is provided with individual filtering units which may be moved into and out of the influence of a magnetic field, which filtering units are adapted to be exposed to a stream of air when they are located within the magnetic field and which are adapted to be cleaned when they are located exteriorly of the magnetic field and are not exposed to the stream of air.

It is a further object of the present invention to provide a magnetic filter arrangement in which the magnet means relied on to generate the magnetic field comprises permanent magnets so that no outside source of electricity is needed to produce the magnetic field and so that a minimum amount of maintenance is required.

With the above objects in view the present invention mainly consists in a gaseous medium filter for filtering out magnetizable particles which comprises a support frame defining a predetermined space having at least two faces opposite and spaced from each other. Permanent magnet means are mounted on the support frame adjacent said faces thereof for generating a magnetic field entirely within the predetermined space so that lines of magnetic flux cross at least a channel-like part of the space between the faces of the support frame. The support frame is adapted to transmit lines of magnetic flux between the faces thereof.

Filtering means are mounted on the support frame for movement along at least one predetermined path into and out of the part of the space between the faces of the support frame and adjacent the magnet means.

The filtering means comprises a plurality of filtering units each of which consists of a plurality of magnetizable plate members. At least one of these plate members is a ferromagnetic plate member opposite and spaced from the magnet means. The plate members are spaced from each other and are adapted to be exposed to a stream of gaseous medium to be filtered so that the gaseous medium passes through the spaces between the plate members when the plate members are located within the part of the space between the faces of the support frame so that magnetizable particles in the stream of gaseous medium will be urged against or attracted by the plate members.

The plate members are preferably of substantially the same size and are connected to each other so as to be magnetically isolated with respect to each other. Also, at least the end plate members and one of the intermediate plate members may be ferromagnetic plate members.

Suitable means may be provided for removing magnetizable particles from the plate members which are a part of filtering means when the same are not located within the magnetic field generated by the magnet means.

Also, shielding means may be mounted on the support frame for shielding at least a part of the support frame and at least one of the end ferromagnetic plate members of each filtering unit so that the gaseous medium to be filtered may flow through only a portion of the part of the space between the faces of the support frame.

Figure 2:
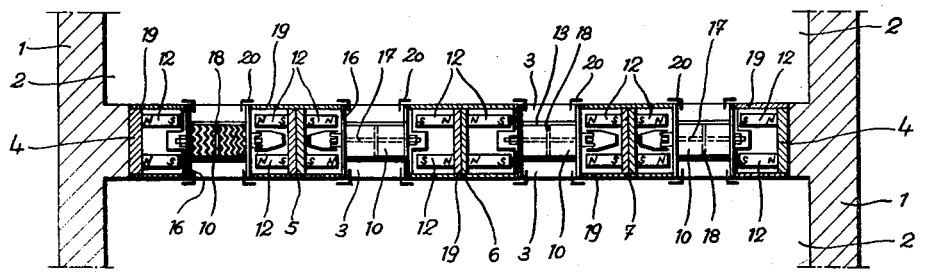

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic front elevational view of a preferred embodiment of the present invention; and Fig. 2 is a schematic plan view, partly in section, of the embodiment illustrated in Fig. 1.

Referring now to the drawing, there is shown a filter structure 1 having an air passage 2 through which a stream of gaseous medium to be filtered, such as air, may be passed. A support frame is fixedly mounted to the apparatus 1 and is composed of two vertical strips 4 and two horizontal strips 3. These members are made of magnetic or magnetizable material for a purpose to be described below.

The frame 3, 4 is divided into separate sections by means of the double strips 5, 6 and 7 which are vertical strips fixedly connected to the horizontal strips 3, as is shown in the drawing, so as to define the spaces containing the channels 8 and 9. The strips 5, 6 and 7 are also made of magnetic material.

The channels 8 and 9 are each adapted to be traversed by a plurality of filtering units 10 which are fixedly secured to conveyor chains (not shown), by means of which the filtering units 10 are guided through the channels 8, 9. The conveyor chains carrying the filtering units 10 are guided and/or driven by sprocket wheels 11, and suitable means for driving the sprocket wheels may be provided.

Magnet means are connected to the structure 3, 4, 5, 6, 7 to produce a closed or self-contained magnetic field within the space defined by the supporting frame 3. As is clearly shown in the drawings a plurality of permanent bar magnets 12 are mounted on the faces of the strips 4, 5, 6 and 7, the arrangement being such that the bar magnets secured to the strips 4 and 6 impart a north polarity to these strips and the bar magnets secured to the strips 5 and 7 impart a south polarity thereto. Consequently, lines of magnetic flux pass through a part of the space between the strips, namely, through the space between the free ends of the bar magnets which bound the channels 8 and 9 through which the filter units 10 move.

Since the structure 3, 4, 5, 6, 7 is made of magnetic material, it serves as a return path for the lines of magnetic flux traversing the channels 8 and 9 so that there will be no leakage field generated exteriorly of the space defined by the support frame 3, 4. As a result the entire magnetic field generated by the permanent bar magnets 12 is concentrated within the support frame 3, 4 and by virtue of the particular arrangement of the bar magnets a strong magnetic field is induced within the channels 8 and 9.

The arrangement of the device is such that a stream of air or other gaseous medium to be filtered is passed through transversely through the channels 8 and 9. The filter units 10 which are moved through these spaces will be subjected to the magnetic field generated by the bar magnets 12 so that the magnetizable particles in the stream of air passing through the channels 8 and 9 will be urged toward the filter elements constituting the individual filter units 10.

The filter elements are preferably composed of corrugated magnetic plate members, such as dynamo sheet iron or laminated sheet iron, which are spaced from each other.

In the illustrated embodiment the individual plate members are approximately the same size and are substantially parallel to each other. The stream of air to be filtered is passed through the space between the individual plate members. It will be understood, therefore, that when the plate members of any particular filter unit 10 are located within the channels 8 or 9 they are subjected to the magnetic field generated by the magnets 12. Magnetizable particles contained in the stream of gaseous medium, such as air, will likewise come under the influence of the magnetic field generated by the magnets 12. As a result the magnetizable particles will be attracted by the individual plate members so as to adhere thereto, so that the gaseous medium leaving the channels 8 and 9 will not contain any magnetizable particles.

As is set forth above, the filter units are movable into and out of the channels 8 and 9. A chamber 14 is located above and a chamber 15 is located beneath the support frame 3, 4. When the individual filter units 10 pass through these chambers, the units will not be under the influence of any magnetic field. It is therefore possible easily to remove from the individual plate members which constitute the filtering unit 10 any magnetizable particles that adhere to the plate members while the same were exposed to the stream of fluid to be filtered and while the plate members were under the influence of the magnetic field generated by the permanent bar magnets 12.

Suitable means for removing the magnetizable particles from the filtering units may be provided which are located either in chamber 14 or in chamber 15, or in both. The means for removing the magnetizable particles may consist of an oil bath 15a within the chamber 15, or of a suitable arrangement for directing a stream of fluid under pressure against the filtering units 10, such as the blowers 14a located in the chamber 14, the arrangement being such that the filtering units pass in front of the blowers. Alternatively, the magnetizable particles may simply be permitted to drop off the individual plate members inasmuch as the same are no longer under the influence of a magnetic field. In connection with the latter arrangement, a vibrating or tapping arrangement may be provided for jarring the filter units 10 so that individual particles which may still adhere to the plate members by virtue of residual magnetism will be jarred loose.

In order to increase the efficacy of the individual filtering units, each unit may include at least one ferromagnetic plate member 16 which is located near the bar magnets 12. In the preferred embodiment each filter unit 10 includes three ferromagnetic plate members, two of them being the end plate members nearest the magnets 12, and one plate 18 arranged intermediate the plate 16 so as to homogenize the magnetic field within each individual filter unit 10. A screw 17 made of non-magnetic material is provided fixedly to secure the individual plate members to each other.

Alternatively, the filter units 10 may be made of Raschig rings or other non-rigid filter elements of ferromagnetic material instead of the plate members described above. According to such an arrangement it may be desirable to provide spacing elements of non-magnetic material so as to prevent physical contact between the rings or other filter elements.

A shield 19 of non-magnetic material covers the frame 3, 4 as well as the chambers 14 and 15 on the inlet side of the stream of gaseous medium so that the stream of air to be filtered may pass only through the channels 8 and 9. The shield 19 may cover that portion of the channels 8 and 9 through which the ferromagnetic plate members 16 pass so that the stream of air to be filtered may flow through only a portion of these channels. In the illustrated embodiment, angle members 20 which are also made of non-magnetic material, are provided which extend into the channels 8 and 9 so as to act not only as an auxiliary shield for protecting the ferromagnetic plate members 16 from direct impingement of the incoming stream, but also act as guides for guiding the plates 16 as the filter units 19 move through the channels 8 and 9.

While the illustrated embodiment shows two sets of channels 8 and 9, it will be understood that an efficient filtering apparatus may be constructed which is provided with either only one set of channels or is provided with more than two such sets.

It will be understood that each of the elements described above, or two or more together, may also find a useful application in other types of filtering apparatus differing from the types described above.

While the invention has been illustrated and described as embodied in a magnetic filtering apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential charafteristics of the generic or specific aspects of this invention and, therefore, such adaptations should and are intended to be comprehended within the meaning and range of equivalence of the following claims.

What is claimed as new and desired to be secured by Letters Patent is:

1. In a filter, in combination, a support frame made of magnetic material; magnet means fixedly mounted on said support frame, said magnet means and said support frame being so constructed and arranged as to define a predetermined filter space, for generating a self-contained magnetic field the lines of magnetic flux of which traverse said space, said support frame constituting a magnetic return path; and filtering means in said space and adapted to be exposed to a stream of gaseous medium to be filtered whereby magnetizable particles in the stream of gaseous medium will be urged against said filtering means.

2. In a filter for filtering out magnetizable particles, in combination, a support frame made of magnetic material; magnet means fixedly mounted on said support frame, said magnet means and said support frame being so constructed and arranged as to define a predetermined filter space, for generating a self-contained magnetic field the lines of magnetic flux of which traverse said space, said support frame constituting a magnetic return path; and filtering means mounted on said support frame for movement along at least one predetermined path into and out of said space and adapted to be exposed to a stream of gaseous medium to be filtered when said filtering means is located within said part of the space between said faces of said support frame so that when said filtering means is exposed to a stream of gaseous medium to be filtered magnetizable particles in the stream of gaseous medium will be urged against said filtering means.

3. In a filter for filtering out magnetizable particles, in combination, a support frame made of magnetic material; magnet means fixedly mounted on said support frame, said magnet means and said support frame being so constructed and arranged as to define a predetermined filter space, for generating a self-contained magnetic field the lines of magnetic flux of which traverse said space, said support frame constituting a magnetic return path; filtering means mounted on said support frame for movement along at least one predetermined path into and out of said space and adapted to be exposed to a stream of gaseous medium to be filtered when said filtering means is located within said space so that when said filtering means is exposed to a stream of gaseous medium to be filtered magnetizable particles in the stream of gaseous medium will be urged against said filtering means; and means for removing magnetizable particles from said filtering means when the same is not located within the magnetic field generated by said magnet means.

4. In a filter for filtering out magnetizable particles, in combination, a support made of magnetic material; magnet means fixedly mounted on said support, said magnet means and said support frame being so constructed and arranged as to define a predetermined filter space, for generating a self-contained magnetic field the lines of magnetic flux of which traverse said space, said support frame constituting a magnetic return path; and magnetizable filtering means mounted on said support for movement into and out of the magnetic field generated by said magnet means and adapted to be exposed to a stream of gaseous medium to be filtered when said filtering means is located within the magnetic field generated by said magnet means so that when said filtering means is exposed to a stream of gaseous medium magnetizable particles in the stream of gaseous medium will be attracted by said filtering means.

5. In a filter for filtering out magnetizable particles, in combination, a support made of magnetic material; magnet means mounted on said support, said magnet means and said support frame being so constructed and arranged as to define a predetermined filter space, for generating a self-contained magnetic field the lines of magnetic flux of which traverse said space, said support frame constituting a magnetic return path; and filtering means comprising a plurality of filtering units mounted on said support for movement of individual filtering units into and out of the magnetic field generated by said magnet means, each of said filtering units consisting of a plurality of plate members spaced from each other and adapted to be exposed to a stream of gaseous medium to be filtered so that the gaseous medium passes through the spaces between said plate members when said plate members are located within the magnetic field generated by said magnet means so that magnetizable particles in the stream of gaseous medium will be urged against said plate members.

6. In a filter for filtering out magnetizable particles, in combination, a support frame made of magnetic material; magnet means mounted on said support frame, said magnet means and said support frame being so constructed and arranged as to define a predetermined filter space, for generating a self-contained magnetic field the lines of magnetic flux of which traverse said space, said support frame constituting a magnetic return path; and filtering means comprising a plurality of filtering units mounted on said support frame for movement along at least one predetermined path of individual filtering units into and out of said space, each of said filtering units consisting of a plurality of magnetizable plate members, spaced from each other and adapted to be exposed to a stream of gaseous medium to be filtered so that the gaseous medium passes through the spaces between said plate members when said plate members are located within said space so that magnetizable particles in the stream of gaseous medium will be attracted by said plate members.

7. In a filter for filtering out magnetizable particles, in combination, a support frame; magnet means mounted on said support frame and including a pair of spaced magnets dissimilar poles of which face each other and are spaced from each other so as to define a filter space, the other pole of each magnet being fixedly attached to said support frame, for generating a self-contained magnetic field the lines of magnetic flux of which traverse said space, said support frame constituting a magnetic return path; and filtering means comprising a plurality of filtering units mounted on said support frame for movement along at least one predetermined path of individual filtering units into and out of said space, each of said filtering units consisting of a plurality of magnetizable plate members and at least one ferromagnetic plate member opposite one of said facing poles, said plate members being spaced from each other and adapted to be exposed to a stream of gaseous medium to be filtered so that the gaseous medium passes through the spaces between said plate members when said plate members are located within said space between said facing poles so that magnetizable particles in the stream of gaseous medium will be attracted by said plate members.

8. In a filter for filtering out magnetizable particles, in combination, a support frame made of magnetic material; magnet means fixedly mounted on said support frame and including a pair of spaced magnets dissimilar poles of which face each other and are spaced from each other so as to define a filter space, the other pole of each magnet being fixedly attached to said support frame, for generating a self-contained magnetic field the lines of magnetic flux of which traverse said space, said support frame constituting a magnetic return path; filtering means mounted on said support frame for movement along at least one predetermined path into and out of said part of the space and adapted to be exposed to a stream of gaseous medium to be filtered when said filtering means is located within said space so that when said filtering means is exposed to a stream of gaseous medium to be filtered magnetizable particles in the stream of gaseous medium will be urged against said filtering means; and shielding means mounted on said support frame for shielding said magnets as well as that part of said support frame which is in the path of the flowing medium to be filtered so that the gaseous medium to be filtered may flow through only said part of the space between said faces of said support frame.

References Cited in the file of this patent

UNITED STATES PATENTS

| | | |
|---|---|---|
| 1,831,369 | Shirp | Nov. 10, 1931 |
| 2,437,681 | Crockett et al. | Mar. 16, 1948 |
| 2,604,207 | Scott | July 22, 1952 |

FOREIGN PATENTS

| | | |
|---|---|---|
| 234,729 | Switzerland | Oct. 13, 1944 |
| 474,684 | Canada | June 26, 1951 |
| 911,072 | France | Feb. 25, 1946 |